Patented Apr. 3, 1951

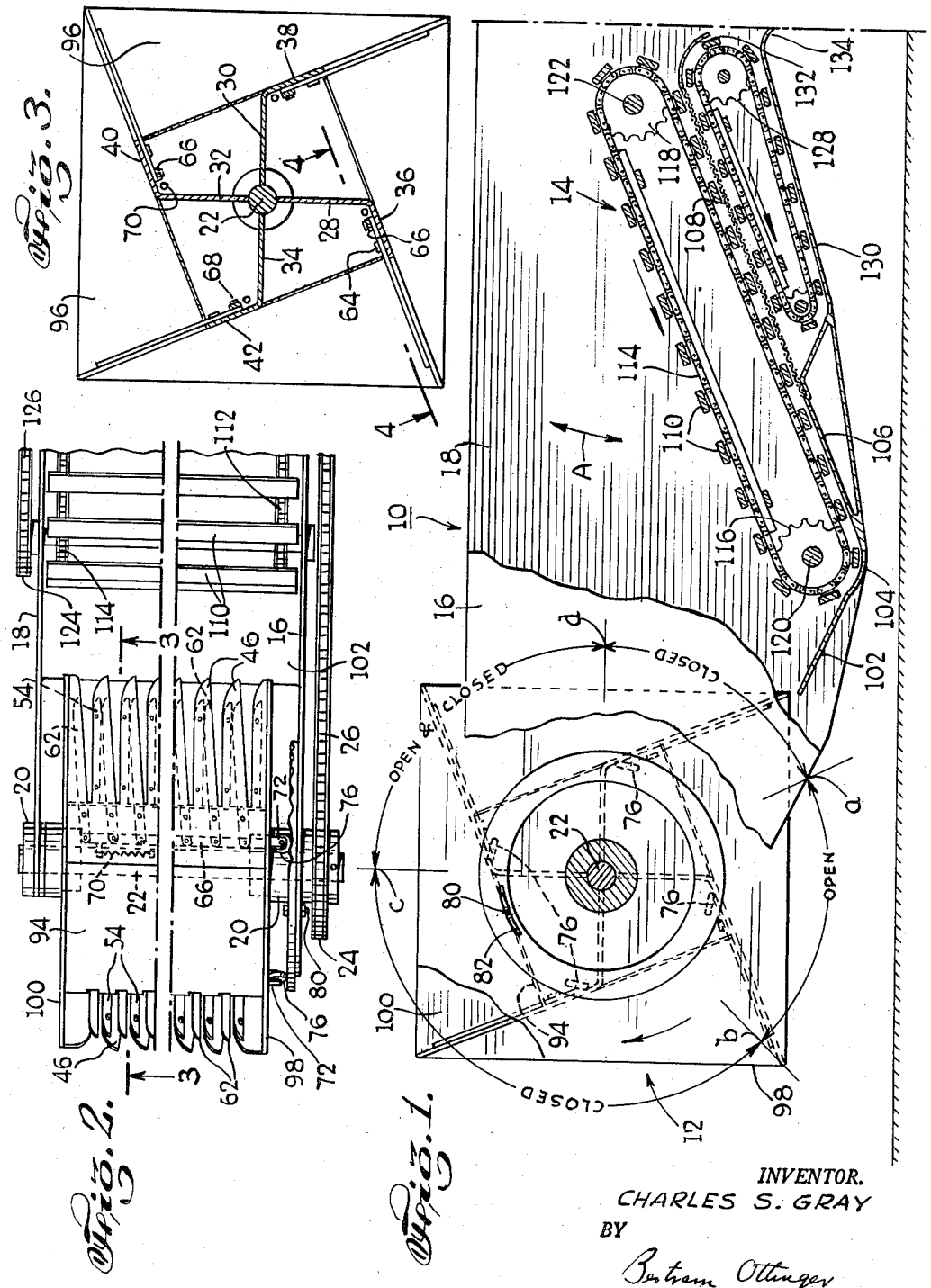

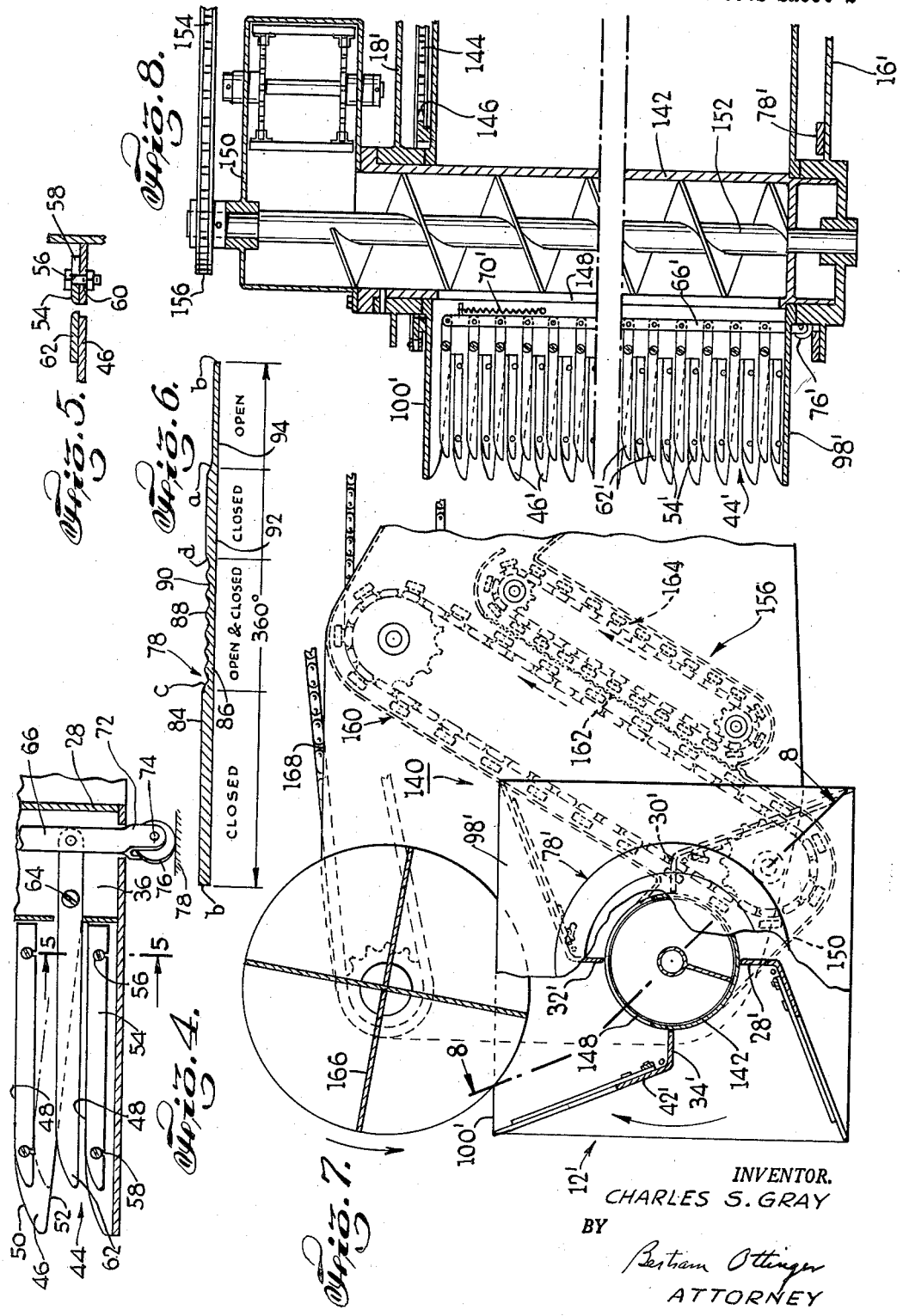

2,547,749

UNITED STATES PATENT OFFICE 2,547,749

GRAIN STRIPPING MECHANISM

Charles S. Gray, New York, N. Y., assignor of one-half to Nicholas H. Jacovatos, New York, N. Y.

Application August 25, 1948, Serial No. 46,127

13 Claims. (Cl. 56—130)

This invention relates to harvesters, i. e., to machines which are designed to reap the fruits of plants. Typical of the types of plants which harvesters embodying my invention are designed to reap are wheat, barley, oats, rice and soy beans.

Present-day harvesters are provided with mechanisms for cutting the stems or stalks of plants, for thrashing the cut plants to free the fruits (hereinafter for convenience simply referred to as grain), and for handling the straw (the stems or stalks).

It is an object of my invention to provide a harvester which in its operation strips the grain from standing plants and thus eliminates the cutting mechanisms, e. g., cutter bars, and also the straw handling mechanisms such as straw walkers and straw spreaders.

It is another object of my invention to provide a harvester which, in stripping grain from standing plants, removes a comparatively small quantity of extraneous plant material so that the thrashing mechanism has considerably less bulk to handle than heretofore.

It is a further object of my invention to provide a harvester which, in stripping grain from standing plants, obtains a large proportion of the grain in a free state so that the work of the thrashing mechanism is further reduced.

It is an ancillary object of my invention to provide a harvester of the character described in which the free grain is separated from the stripped material prior to thrashing.

It is an additional object of my invention to provide a harvester which can reap grain from high and low plants, and even from plants which have been downed as by sleet, hail, or high winds and lie tangled on the ground.

It is yet another object of my invention to provide a harvester of the character described embodying novel and simple mechanisms which enable the harvester to carry out its desired functions in a rapid and uncomplicated manner.

It is still another object of my invention to provide a harvester of the character described having a rugged and compact construction and which can be manufactured at a relatively low cost.

Other objects of my invention will in part be obvious and in part will be pointed out hereinafter.

My invention accordingly consists in the features of construction, combinations of elements and arrangements of parts which will be exemplified in the constructions hereinafter described, and of which the scope of application will be indicated in the appended claims.

In the accompanying drawings, on which are shown various possible embodiments of my invention, Fig. 1 is a side view, partially broken away, of the reaping and free-grain-separating mechanisms of a harvester, these being the mechanisms constructed in accordance with my invention;

Fig. 2 is a top plan view of the portion of the harvester shown in Fig. 1;

Fig. 3 is a sectional view taken substantially along the line 3—3 of Fig. 2;

Fig. 4 is an enlarged sectional view taken substantially along the line 4—4 of Fig. 3;

Fig. 5 is a sectional view taken substantially along the line 5—5 of Fig. 4;

Fig. 6 is a developed view of a cam forming part of the reaping mechanism;

Fig. 7 is a view similar to Fig. 1 of a harvester embodying a modified form of my invention; and Fig. 8 is a sectional view taken substantially along the line 8—8 of Fig. 7.

As indicated above, a phase of my invention deals with the removal, in a novel fashion, of grain from standing plants. This phase of my invention can be embodied in a harvester which performs a stripping function only, and collects the stripped material and stores it for further processing. However, a substantial advantage of the invention is not availed of unless the harvester also includes the free-grain-separating mechanism immediately to remove the free grain from the remainder of the stripped material and thus achieve an initial and immediate separation which simplifies the subsequent operations. The harvester additionally may include such mechanisms as a thrashing cylinder and a recleaning screen, so that the entire unit constitutes a combine which performs all necessary operations to achieve an optimum recovery of the grain.

In general, the stripping operation is performed by a plurality of pairs of fingers mounted to turn about a horizontal axis in such a direction that when the fingers are forward of the axis they move in an upward direction. To simplify construction and maintain a high efficiency of operation, the fingers may be arranged in one or more rows extending along said axis, a plurality, e. g., four or more, of such rows preferably being used. In order to enable the stripper to be employed on plants of various types and different degrees of growth, one of each pair of fingers desirably is adjustable in a direction towards and away from the other. Moreover, so that the fingers may be able to engage a large number of stalks at each stripping operation, and yet be able to strip the grain and ensure clearing of the fingers, the other finger of each pair is arranged to be movable towards and away from its associated finger and is controlled by a mechanism which thus moves the finger in a proper cycle. In addition, when the pairs of fingers are arranged in rows, the stripper includes teeth or similar devices to guide the plants into the spaces between the pairs of open fingers.

The free-grain-separating mechanism basically comprises a separating element such as a screen onto which the stripped material is thrown by the stripping fingers. Preferably, the screen has cooperating therewith a traversing mechanism, such as an open type conveyor, for ensuring passage of the stripped material across the screen without blocking the screen so that all the free grain may be given an opportunity to fall through the screen. Another suitable mechanism, such as another open type conveyor, may be provided beneath the screen to lead the screened grain away for further operations forming no part of the present invention.

Referring now in detail to the drawings, and more particularly to Figs. 1–6, the reference numeral 10 denotes the fore portion of a harvester including a winged finger grain stripper 12 and a free grain cleaner or separator 14 embodying my invention.

The harvester has a frame comprising a pair of forwardly extending plates 16, 18 carried in a conventional manner by a vehicle chassis (not shown) which forms part of a combine including a thrashing cylinder and a recleaning screen of ordinary construction. Preferably, the plates 16, 18 are connected to the vehicle chassis by a standard operator-controlled height adjusting mechanism so that the elevation of the plates may be varied by swinging the same in the direction of the double-headed arrow A.

A pair of bearings 20, 20 mounted on the plates 16, 18 rotatably support a horizontal shaft 22. Said shaft has a sprocket 24 fixed thereto and engaging a chain 26 which is driven by a suitable source of rotary power, e. g., an engine mounted on the vehicle chassis. The chain is driven in such direction that the shaft 22 turns clockwise as viewed in Fig. 1. Suitably secured to the shaft, as by welding, are four radially extending arms 28, 30, 32, 34 which span almost the entire distance between the frame plates 16, 18. Said arms serve as supports for wings 36, 38, 40, 42 integrally attached to the outer edges of the arms. In accordance with a feature of my invention, these wings are arranged at an angle to the arms, being inclined in a direction, as shown to lead the arms. The function of such inclination will be pointed out later herein.

The forward edge of each wing has formed therein a series of deep notches 44, hereinafter referred to as throats, which divide said edge into a plurality of parallel teeth 46. Said teeth are of identical configuration. A typical tooth (see Fig. 4) has one edge 48 running perpendicularly to the shaft 22 from the base of the throat outward for the greater part of the length of the tooth. The outermost portion 50 of said edge is inclined towards the opposite edge 52 of the tooth so that the tip of the tooth is tapered. Said opposite edge 52 diverges from the adjacent edge of the next tooth whereby each throat is of flaring configuration and includes one perpendicular and one diverging side. The teeth in the successive wings are staggered, i. e., offset transversely so that all the plants will be stripped.

An adjusting plate 54 is shiftably secured to each tooth adjacent the edge 48 in a manner such that it can be moved in a direction normal to said edge from a position in which it is in registry with said edge to a position in which it projects into the throat 44. A satisfactory mounting of this nature comprises a pair of bolts 56 whose shanks pass through slots 58 in the adjusting plates and underlying holes 60 in the teeth.

Associated with each tooth is a moving finger 62 which is arranged to be shiftable towards and away from a stationary adjusting plate 54. To this end, the finger 62 is pivoted on a stud 64 secured to the wing in back of the adjacent throat. The stud is so located that the moving finger can be swung from a closed position (illustrated by the full lines in Fig. 4) in which it is perpendicular to the shaft 22 and, therefore, parallel to the cooperating edge of the stationary adjusting plate, to an open position (illustrated by the dot-and-dash lines in Fig. 4) in which it is in registry with or behind the diverging edge 52 of the underlying tooth. The moving finger 62 and stationary adjusting plate or finger 54 are coplanar and are located on the leading surface of the teeth in the direction of rotation.

Means is provided to move the fingers 62 between the limits mentioned. Said means comprises a bar 66 on each wing parallel to the shaft 22. The bar is pivotally connected by pins 68 to each finger on the wing so that the fingers will move in unison. A helical tension spring 70 attached at one end to the bar and at its other end to the wing urges the bar in a direction to open the moving fingers, i. e., to urge the moving fingers away from the stationary fingers.

An end 72 of the bar projects beyond a side of the wing where it is formed into a yoke which supports an axle 74 on which a roller 76 turns, said axle being so oriented that the roller is adapted to roll along a path concentric with the shaft 22. The roller rides on a ring cam 78 journalled on the frame plate 16 concentrically of the shaft 22. The cam is held in any desired adjustable angular position by a bolt 80 passing through a hole in the frame plate and an arcuate slot in the cam.

The annular cam surface consists of four sectors, to wit: a high sector 84 of uniform elevation, a following sector 86 having a series of peaks 88 and troughs 90, a following high sector 92 of uniform elevation, and a following low sector 94 of uniform elevation. The high sectors 84, 92 and the peaks 88 are of a common elevation such that when the roller rides thereon it will force the moving fingers to their closed position. When the roller is at the elevation of the troughs and low sector the fingers are in open position, being urged thereto by the springs 70. The sectors are so mutually angularly arranged that as the fingers move up along the stalks or stems of the plants the fingers are open, as the fingers move along the grain bearing portions of the plants the fingers are closed, as the fingers travel to the rear of the shaft 22 the fingers rapidly open and close, and as the fingers move downwardly from a horizontal rearwardly extending position the fingers are closed until the last point of discharge from the stripping fingers is passed.

Baffle plates 94 are provided to close off the space between the bases of the teeth on each wing and the base of the preceding wing whereby each pair of wings and the intermediate baffle plate form a compartment 96. The sides of the compartments are closed off by walls 98, 100.

The mechanism for receiving the stripped material includes a rearwardly and downwardly sloping apron 102 whose forward edge is positioned adjacent the path of travel of the tips of the teeth at about the middle of the lower rear quadrant of said path. Said apron is attached to the frame plates 16, 18 and runs into the curved front section 104 of an upwardly inclined base plate 106 forming part of the free-grain-separator 14. Said separator also includes a screen 108 constituting an extension of the base plate 106. Mounted to ride across the screen in a rearward direction are a series of transverse parallel spaced slats 110 whose opposite ends are secured to parallel chains 112, 114. These chains are trained around sprockets 116, 118 fixed to horizontal shafts 120, 122. One of the shafts, e. g., the shaft 120, is driven by a sprocket 124 and chain 126 from a suitable source of power in a direction such that the lower flight of the slats moves rearwardly over the screen 108.

Beneath said screen is another slat conveyor 128 of the same general construction as the open type conveyor above the screen. The second conveyor has its lower flight riding on an upwardly inclined, rearwardly extending bottom wall 130 whose forward edge is jointed to the base plate 106.

The rear edge of the screen is connected to a discharge plate 132 leading to a thrashing cylinder (not shown), and the rear edge of the bottom wall 130 is connected to a free grain discharge plate 134 leading to a recleaning screen (not shown).

In the operation of the harvester 10, the adjustable fingers are set in accordance with the type of growth and size of kernel to be stripped so that when the closed fingers are combed through the plants, the fingers are far enough apart to permit the stems and stalks to slide therethrough without uprooting the plants. However, the fingers are close enough together to prevent the kernels from passing between the same. The height of the frame plates is regulated so that the stripping fingers will operate in the grain bearing portions of the plants. A screen 108 is used having openings of the proper dimensions to pass the size of grain being harvested.

As the harvester is moved through a field with all its shafts turning, each row of stripping fingers will open at position $a$ and remain open to position $b$. During this period $ab$, the fingers are moving into the standing stalks beneath the grain bearing portions. The teeth 46 divert the stalks into the throats 44 which, because of their flaring shape, fill readily. At $b$ the cam 78 closes the fingers and holds them closed to position $c$. From $b$ to $c$ the closed fingers move through the grain bearing portions and strip the grain therefrom. A large percentage of the grain is stripped free at such time. In addition, some other extraneous material, e. g., foliage, also is stripped from the plant, some of it carrying grain. The free grain drops upon the baffle plate 94 and is prevented from falling out to the side of the wings by the walls 98, 100.

From $c$ to $d$ the cam and spring 70 close and open the stripping fingers rapidly. As the fingers first open, the material held fast between the fingers is released and thrown by centrifugal force onto the apron 102 and slats 110. Subsequent opening and closing of the fingers ensures clearing of all material from between the same. Additionally, from $c$ to $d$ free grain lying on the baffle plate is thrown rearwardly onto the free-grain-separator 14.

At $d$ the cam closes the fingers and they remain closed to $a$. From $d$ to $a$ free grain remaining on the baffle plates will slide down over the plates and over the backs of the preceding closed fingers by gravity onto the apron 102, the closed fingers preventing any drop of free grain onto the ground ahead of the apron.

It thus will be apparent that the baffle plates regulate the discharge of free grain to the proper point in the rotation of the fingers and that they are assisted in this action by the inclination of the wings. Such inclination, moreover, is of particular importance in enabling the fingers to reach their best stripping position (horizontal) at a level well below the shaft 22 whereby the harvester can function efficiently on low growing plants. When operating on downed plants, the frame is lowered to let the wing teeth engage the plants on the ground. Thereafter, the stripping fingers operate in the manner already described.

The foregoing timing, with the changeover points $a$, $b$, $c$ and $d$ located as shown, will obtain highly satsfactory results. However, for optimum performance, these points may have to be shifted somewhat to change the timing of the stripping finger cycle. Such adjustment is performed by loosening the bolt 80, shifting the cam 78, and retightening said bolt. It also will be understood that cams with other timings can be substituted.

Free grain thrown onto the slats 110 will fall through the space between said slats onto the screen 108 through which it will drop onto the lower conveyor 128. The other stripped material, as well as the free grain falling on the apron 102 will be carried over the screen by the slats 110. Thus, all free grain is separated immediately following stripping and only a comparatively small bulk of material is led from the discharge of the first slat conveyor to the thrashing cylinder. This material, it will be observed, contains neither free grain nor straw, although some grain still is attached.

The free grain falling through the screen is discharged to the recleaning screen by the second or lower conveyor 128.

The modified form of harvester 140 shown in Figs. 7 and 8 is identical with the harvester 10, insofar as the stripping mechanism is concerned and, accordingly, the same numerals primed have been used in the drawings to denote similar parts. However, instead of being mounted on a shaft, the arms 28', 30', 32', 34' are mounted to turn with the side walls 98', 100' on a horizontal drum 142 fixed to the frame plates 16', 18'. The inner edges of said arms thus ride around the drum. The wings are turned by a chain 144 and ring sprocket 146 fixed to the wall 100'.

The stripping mechanism includes a wing 42' carried by each arm. The forward edge of each wing has formed therein a series of deep notches or throats 44' which divide said edge into a plurality of parallel teeth 46'. An adjusting plate 54' is shiftably secured to each tooth adjacent one edge thereof. Associated with each tooth 46' is a moving finger 62' which is arranged to be shiftable toward and away from a stationary adjusting plate 54'. To this end each finger 62' is pivoted on a stud 64' secured to the wing in back of the adjacent throat. A bar 66' connects all the moving fingers 62' for joint movement. A tension spring 70' biases said bar in a direction to urge the moving fingers away from the stationary plates. Mounted on the bar is a roller 76' which rides on a stationary ring cam 78' as the arms revolve whereby to cause the movable fingers to oscillate toward and away from the plates 54', the timing being the same as for the cam 78.

The drum is formed with a longitudinal opening 148 in its upper half through which all stripped material, including free grain, falls.

The drum extends beyond the wall 100', and optionally beyond the frame plate 16', where it leads into a chute 150. The stripped material is conveyed through the drum to the chute by a feed auger 152 rotatable in the drum. Said auger is turned by a chain 154 and sprocket 156.

The chute 150 discharges into a free-grain-separator 156 generally similar to the separator 14. The separator 158 includes a rearwardly inclined steep open-type slat conveyor 160 whose lower flight rides on a screen 162. A similar conveyor 164 is disposed beneath the screen. Both conveyor and the screen operate in a fashion identical to that already described with respect to the similar parts of the harvester 10.

Inasmuch as the free-grain-separator 156 is to the side of the stripping mechanism, it need not be made as wide as the separator 14. Moreover, by locating the separator on the side of the harvester, the stripping mechanism can be brought closer to the ground, which makes the harvester 140 more suitable for reaping such low crops as soy beans.

To prevent stripped material from being thrown rearwardly by centrifugal force, I employ a deflecting means in conjunction with the harvester 140. Such means may comprise a plurality of vanes 166 mounted to be turned about a horizontal axis by a chain 168 and arranged to extend into the spaces between the rows of fingers. The rotation of said vanes is synchronized with that of the stripping fingers.

It thus will be seen that I have provided harvesters which achieve the several objects of my invention and are well adapted to meet the conditions of practical use.

As various possible embodiments might be made of the above invention, and as various changes might be made in the embodiments above set forth, it is to be understood that all matter herein described, or shown in the accompanying drawings, is to be interpreted as illustrative and not in a limiting sense.

Having thus described my invention, I claim as new and desire to secure by Letters Patent:

1. A harvester comprising a stripping mechanism adapted to be carried by a vehicle through a field of standing plants at the level of the grain bearing portions, said mechanism including a row of spaced teeth mounted to turn about a horizontal axis, a finger associated with each tooth, means to adjust the setting of each finger with respect to the space between its associated tooth and the next adjacent tooth, a second finger associated with each tooth and coplanar with the first named finger, means to move said fingers towards and away from each other, and means to turn said teeth and fingers together about said axis in such a direction that when the fingers are in front of said axis they move upwardly; whereby the grain is stripped from the standing plants, said finger moving means being timed to bring said fingers close together when they are moving upwardly.

2. A harvester as set forth in claim 1 wherein the finger moving means includes a cam.

3. A harvester as set forth in claim 1 wherein the finger moving means includes a cam to move the fingers together and a spring to move the fingers apart.

4. A harvester as set forth in claim 1 wherein the finger moving means rapidly open and close the fingers as they start to move downwardly.

5. A harvester as set forth in claim 1 wherein the fingers are inclined in the direction of rotation and are offset from the axis of rotation.

6. A harvester comprising a stripping mechanism adapted to be carried by a vehicle through a field of standing plants at the level of the grain bearing portions, said mechanism including a plurality of arms extending radially away from a common horizontal axis, means to turn said arms about said axis in such a direction that when the arms are in front of said axis they move upwardly, wings carried by said arms, said wings being inclined in the direction of rotation and having outwardly diverging deep notches in their forward edges which divide said edges into teeth, means to adjustably mount one set of fingers on said teeth so that an edge of each such finger is adjacent one edge of each notch and can be set into said notch, a second set of fingers, one associated and coplanar with each finger of the first set, means to pivotally mount the fingers of the second set on said wings for movement into and out of said notches and towards and away from the first fingers, a bar on each wing, each bar being pivotally attached to the fingers of the second set on its wing, springs to move the bars in a direction to urge the fingers of the second set away from the fingers of the first set, a cam concentric with the horizontal axis of rotation, and followers carried by said bars and riding on said cam to move said second set of fingers towards the fingers of the first set, said cam having a portion to permit the springs to open the fingers as they approach a horizontal position forward of said axis, a following portion thereafter to close the fingers and hold them closed until they reach a position above said axis, and a following portion thereafter to cause said fingers to open and close rapidly.

7. A harvester as set forth in claim 6 wherein walls are provided to the outside of the sidemost fingers.

8. A harvester as set forth in claim 6 wherein baffle plates extend from adjacent the roots of each set of teeth to adjacent the roots of the set of preceding teeth.

9. A harvester as set forth in claim 6 wherein the arms turn about a hollow drum coincident with the axis of rotation and wherein a rotating feed auger is disposed inside the drum, said drum having a lengthwise opening in its upper half running the span of the rows of teeth.

10. A harvester comprising a stripping mechanism adapted to be carried by a vehicle through a field of standing plants at the level of the grain bearing portions, said mechanism including a plurality of pairs of fingers mounted to turn about a horizontal axis, means to turn said fingers about said axis in such a direction that when the fingers are in front of said axis they move upwardly, whereby the grain is stripped from the standing plants, and means to move the fingers of each pair towards and away from each other in predetermined timed relationship as said fingers turn about the horizontal axis.

11. A harvester comprising a mechanism adapted to be carried by a vehicle through a field of standing plants at the level of the grain bearing portions, said mechanism including a plurality of pairs of fingers mounted to turn about a horizontal axis, means to turn said fingers about said axis in such a direction that when the fingers are in front of said axis they move upwardly, and means to move the fingers of each pair towards and away from each other in predetermined time relationship as said fingers turn about the horizontal axis.

12. In a harvester including a vehicle: a plurality of pairs of fingers, means to mount said fingers on said vehicle so as to move therewith, said fingers being on the front of said vehicle, means to move said fingers relative to said vehicle through a closed path including a portion in which the fingers move upwardly while they extend from the front of the vehicle, and means to move the fingers of each pair toward and away from each other in predetermined timed relationship such that the fingers are moved together when they are moving upwardly.

13. A harvester comprising a stripping mechanism adapted to be carried by a vehicle through a field of standing plants at the level of the grain bearing portions, and a free-grain-separating mechanism on which the plant material stripped by the first-named mechanism is deposited, said last-named means including a screen on which the stripped plant material is deposited and an imperforate surface beneath the screen, said stripping mechanism including a row of spaced teeth mounted to turn about a horizontal axis, a finger associated with each tooth, means to adjust the setting of each finger with respect to the space between its associated tooth and the next adjacent tooth, a second finger associated with each tooth and coplanar with the first-named finger, means to move said fingers toward and away from each other, and means to turn said teeth and fingers together about said axis in such a direction that when the fingers are in front of said axis they move upwardly, whereby the grain is stripped from the standing plants, said finger moving means being timed to bring said fingers close together when they are moving upwardly.

CHARLES S. GRAY.

REFERENCES CITED

The following references are of record in the file of this patent:

UNITED STATES PATENTS

| Number | Name | Date |
|---|---|---|
| 1,368,014 | Bauert | Feb. 8, 1921 |
| 1,449,869 | Novak | Mar. 27, 1923 |
| 1,596,634 | Smith | Aug. 17, 1926 |
| 1,638,867 | Melton | Aug. 16, 1927 |
| 2,231,354 | Wilcox | Feb. 11, 1941 |
| 2,248,066 | Cory | July 8, 1941 |